(12) United States Patent
Gurram et al.

(10) Patent No.: US 10,282,243 B2
(45) Date of Patent: May 7, 2019

(54) PERFORMANCE ENHANCEMENT FOR PLATFORM DATA DUMP COLLECTION (71) Applicant: International Business Machines Corporation, Armonk, NY (US)

(72) Inventors: Nagendra K. Gurram, Bangalore (IN); Deepak Kodihalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 143 days.

(21) Appl. No.: 15/265,947

(22) Filed: Sep. 15, 2016

(65) Prior Publication Data

US 2018/0074882 A1    Mar. 15, 2018

(51) Int. Cl.
*G06F 11/00* (2006.01)
*G06F 11/07* (2006.01)

(52) U.S. Cl.
CPC ........ *G06F 11/0778* (2013.01); *G06F 11/079* (2013.01)

(58) Field of Classification Search
CPC ............ G06F 11/3604; G06F 11/3612; G06F 11/3644; G06F 11/0778; G06F 11/3476; G06F 11/348; G06F 12/145; G06F 12/10; G06F 12/1036; G06F 12/109; G06F 2212/684
See application file for complete search history.

(56) References Cited

U.S. PATENT DOCUMENTS

| | | | |
|---|---|---|---|
| 3,835,260 A * | 9/1974 | Prescher | H04Q 3/54583 379/237 |
| 7,765,440 B2 | 7/2010 | Zimmer et al. | |
| 7,921,250 B2 | 4/2011 | Lee | |
| 8,032,886 B2 | 10/2011 | Joy et al. | |
| 2006/0059496 A1* | 3/2006 | Joy | G06F 11/3636 719/310 |
| 2009/0077420 A1* | 3/2009 | Sunavala | G06F 11/0721 714/25 |
| 2009/0198968 A1* | 8/2009 | Penfold | G06F 8/456 712/216 |
| 2009/0254555 A1* | 10/2009 | Balakrishnan | G06F 9/455 |

(Continued)

OTHER PUBLICATIONS

Unrau, "Experiences with Locking in a NUMA Multiprocessor Operating System Kernel", Nov. 1994, ACM, p. 1-14 (Year: 1994).*

(Continued)

*Primary Examiner* — Bryce P Bonzo
*Assistant Examiner* — Jeison C Arcos
(74) *Attorney, Agent, or Firm* — Khyle J. Eaton; Brian M. Restauro (57) ABSTRACT

Embodiments of the present invention provide systems and method for improving platform dump collection. The method includes upon receiving a platform dump request for a system, accessing a model of the system hardware and a list of commands for the dump. The method further includes determining whether a constraint exists for the command in the list, identifying which software and hardware locks are required by the constraints, determining whether a hardware and software lock is required by multiple constraints, generating a grouping of the constraints requiring the hardware and software lock, and generating an executable list of commands.

20 Claims, 5 Drawing Sheets

(56) References Cited

U.S. PATENT DOCUMENTS

| | | | |
|---|---|---|---|
| 2010/0023519 A1* | 1/2010 | Kailash | H04L 63/10 |
| | | | 707/E17.007 |
| 2012/0124572 A1* | 5/2012 | Cunningham | G06F 9/45558 |
| | | | 718/1 |
| 2012/0143838 A1* | 6/2012 | Ross | G06F 9/526 |
| | | | 707/704 |
| 2012/0185860 A1* | 7/2012 | Casas | G06F 11/3604 |
| | | | 718/102 |
| 2013/0046939 A1* | 2/2013 | Waddington | G06F 9/526 |
| | | | 711/152 |
| 2013/0086348 A1 | 4/2013 | Marathe et al. | |
| 2015/0235029 A1 | 8/2015 | Morishige et al. | |
| 2018/0060141 A1* | 3/2018 | Kodihalli | G06F 9/526 |

OTHER PUBLICATIONS

Bueso, "Scalability Techniques for Practical Synchronization Primitives", Dec. 2014, ACMQUEUE, p. 1-14 (Year: 2014).*

* cited by examiner

PERFORMANCE ENHANCEMENT FOR PLATFORM DATA DUMP COLLECTION

BACKGROUND OF THE INVENTION

The present invention relates generally to computer system errors, and more particularly to increasing the efficiency of platform dumps when a major error occurs that the computer system cannot process.

Typically, on computer servers, when a major error occurs which the system cannot resolve or progress from, sometimes called a hardware or software checkstop, a platform data dump collection, also known simply as a dump, happens, which assists in failure analysis. The data dump requires various services to be locked from use during the dump. Locking the various services is needed to resolve concurrent hardware access issues, and generally causes the system to be unusable while the platform dump data collection occurs. Additionally, the collection may take upwards of several minutes to complete.

SUMMARY

According to one embodiment of the present invention, a method for improving platform dump collection, the method comprising: responsive to receiving a platform dump request for a system that includes one or more hardware and software locks, accessing, by one or more processors, a model of the system hardware and a list including a plurality of commands for a platform dump; determining, by one or more processors, whether one or more constraints exist for each of the plurality of commands in the list; responsive to determining whether one or more constraints exist for each of the plurality of commands in the list, identifying, by one or more processors, which of the one or more hardware and software locks are required by the one or more constraints; responsive to identifying which of the one or more hardware and software locks are required by the one or more constraints, determining, by one or more processors, whether a first hardware and software lock of the one or more hardware and software locks is required by both a first constraint and a second constraint of the one or more constraints; responsive to determining that the first hardware and software lock of the one or more hardware and software locks is required by the first constraint and the second constraint, generating, by one or more processors, a grouping of the first constraint and the second constraint; and generating, by one or more processors, an executable list of commands, based on the grouping of the first constraint and the second constraint and a determination as to whether the first hardware and software locks are held.

DETAILED DESCRIPTION

When a major error occurs on a computer server, one that the system cannot resolve or progress from, a platform data dump collection occurs. This data dump assists in failure analysis, and requires various services to be locked while the data dump collection occurs.

Currently, this data collection is dependent on multiple items, including the number of processor and/or memory registers, the number of resources on the server, and the type of errors. To collect each and every data point, the system's firmware locks the affected service processor before collecting the data points. The lock implemented on the service processor resolves concurrent hardware access issues.

The data points collected in the data dump includes information that depends on various factors, including, but not limited to: the platform processor architecture and register-set, the type of the server, the scale of the server, and the memory architecture. In some instances, the information included in the dump can vary by platform or by server. Since the information included may change, they need to be specified in a file by each platform or server. This file is sometimes known as the Hardware Dump Content Table, or HDCT. The HDCT comprises a list of commands that server firmware, typically running on a service processor, will have to execute in order to add information to the dump.

Server processor firmware is typically multi-threaded, meaning a single set of code can be used by several processors at different stages of execution. In this context, this means there can be contention to access the same hardware. HDCT commands need to be executed exclusively (i.e., without another process accessing the hardware) in order to retrieve accurate information. For this reason, each of these commands need a software lock on the hardware object model (HOM), or a model of the system hardware, generally created by the system software. In a platform data dump collection, the access to the hardware needs to be serialized via a lock on the HOM. The HOM lock is a mutex, or means of serializing access, which is an attribute of each model that represents a unique piece of hardware, and may be a hardware lock and/or a software lock. Various threads of firmware applications need to lock the mutex to gain access to the hardware. The HOM lock needs to be hierarchical to honor the parent-child hardware hierarchy. A lock request on the entire system would facilitate locking each and every piece of hardware modeled under the system, including all the nodes, processors, memory, cores, and other pieces of hardware. In contrast, an exclusive processor register access request facilitates locking the exclusive processor and all of its children, such as the cores, caches, and others.

Due to the hierarchical nature of the HOM, the HOM lock adds a substantial firmware delay. For example, a dump collection on a four-node high-end server may require such a large number of HOM locks that the total time needed just for lock acquisition may be several minutes or more.

Embodiments of the present invention recognize the need to optimize the time it takes for a platform dump collection. HDCT commands executed during a platform dump collection may have constraints where the commands must be executed in a serialized manner that may not be deviated from. For example, a second command may only be able to be performed after a first command has been executed. Acquiring HOM locks for performing each of the required commands in the order required by a Hardware Dump Content Table (HDCT) may take several minutes or more. Embodiments of the present invention provide solutions for minimizing the time it takes for platform dump collection. In this manner, as discussed in greater detail herein, embodiments of the present invention can provide systems and methods for improving performance for platform dump collections through reducing the number of locks, while still satisfying the constraints of the HDCT so as to not compromise the integrity of the information included in the dump.

Figure 1:
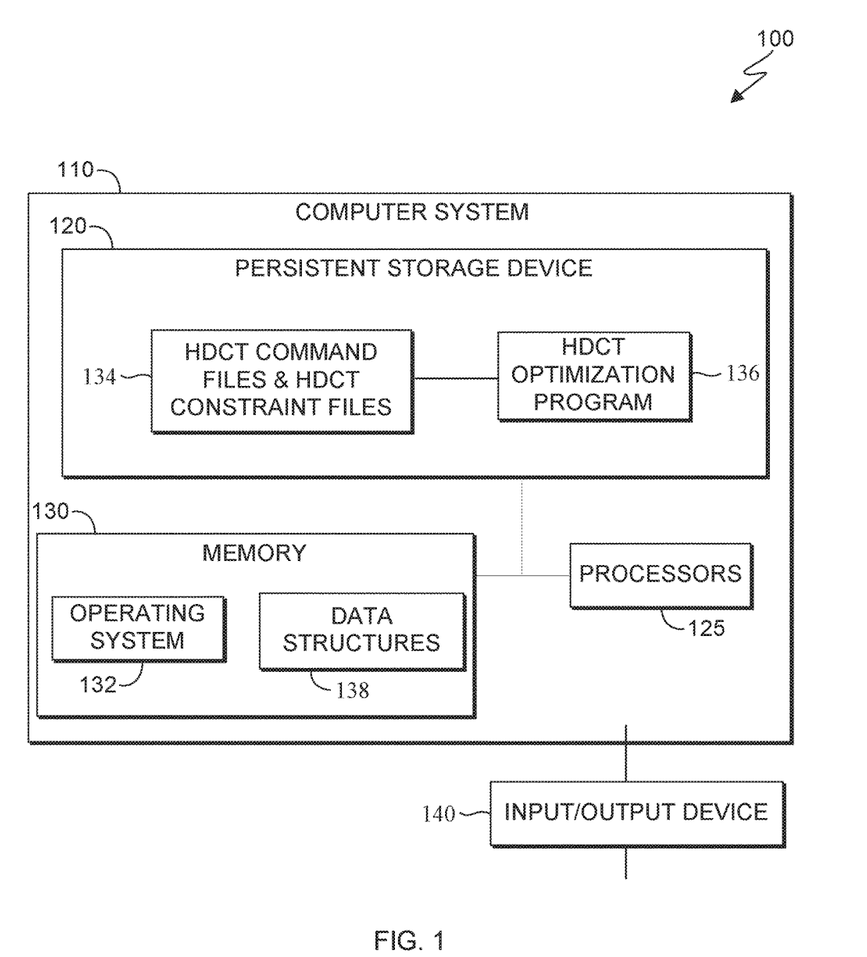
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with an embodiment of the present invention. Modifications to data processing environment 100 may be made by those skilled in the art without departing from the scope of the invention as recited by the claims. In an exemplary embodiment, data processing environment 100 includes computer system 110.

Computer system 110 includes memory 130, persistent storage device 120, processors 125, and input/output device 140. In various embodiments of the present invention, computer system 110 can be a laptop computer, a tablet computer, a netbook computer, a personal computer (PC), a desktop computer, a server computer, a personal digital assistant (PDA), a smart phone, a thin client, or any programmable electronic device capable of executing computer readable program instructions. Computer system 110 may include internal and external hardware components, as depicted and described in further detail with respect to FIG. 4.

Persistent storage device 120 includes HDCT command files & HDCT constraint files 134 and HDCT optimization program 136. Persistent storage device 120 is any data storage device that retains data after the power to a device has been shut off. Persistent storage device 120 may include, for example, non-volatile memory, solid-state drives (SSDs), hard disk drives (HDDs), and archival media (e.g., tape storage).

Hardware Dump Content Table (HDCT) command files & HDCT constraint files 134 generally comprises a list of commands the server firmware, typically running on a service processor, will have to execute to add information to the dump. For more complex systems and larger servers, HDCT command files & HDCT constraint files 134 may have numerous commands, due to the large number of hardware components and corresponding register-set values that need to be collected. The commands in HDCT command files & HDCT constraint files 134 are ordered in a specific fashion because each command is based on the expectation that other commands to have been previously executed. In other words, there is a set of constraints for each command in HDCT command files & HDCT constraint files 134. For example, a constraint may say that, if there are three commands, command 1, command 2, and command 3, the commands must be executed in numerical order. In this example, command 2 cannot be executed before command 1, and command 3 cannot be executed before command 1 and command 2.

HDCT optimization program 136 is an HDCT analysis and optimization program. In this embodiment, HDCT optimization program 136 accesses and analyzes the list of commands in HDCT command files & HDCT constraint files 134. HDCT optimization program 136 may then generate an optimized ordered list of commands in HDCT command files & HDCT constraint files 134 to decrease the time that the platform dump collection takes, while still meeting the necessary constraints, as described in greater detail with regard to FIGS. 3A and 3B. For example, HDCT optimization program 136 helps determine and generate an efficient (e.g., the maximum number of commands possible) set of commands that can be executed with the same HOM lock, without foregoing HDCT constraints. In various embodiments, HDCT command files & HDCT constraint files 134 and HDCT optimization program 136 may be separate programs, on separate devices, or may be included in a single program.

Processors 125 are any set of electronic circuitry within a computer that carries out the specified set of instructions of a computer program. In this exemplary embodiment, processors 125 create the means for implementing the instructions provided by HDCT optimization program 136. In other embodiments, other programmable data processing apparatus may create the means for implementing the instructions.

Memory 130 includes operating system 132 and data structures 138. Memory 130 may also include various other files, tables, databases, etc. Memory 130 may include any suitable volatile or non-volatile computer-readable storage media. In various embodiments, memory 130 is used to store data and instructions, and may be utilized for in-memory storage and processing of data (e.g., objects). In some examples, memory 130 may store software and data, such as HDCT command files & HDCT constraint files 134 and HDCT optimization program 136, in addition to, or separate from, the software and data being stored on persistent storage device 120.

Operating system 132 is any system software that manages computer hardware and software resources. Operating system 132 runs and manages multiple tasks, such as recognizing input from the keyboard, keeping track of files and directories on the disk, controlling peripheral devices, running programs and applications, scheduling tasks, etc.

Data structures 138 provide ways of managing large amounts of data efficiently. Data structures 138 may be used to organize the storage and retrieval of information stored in memory, and may implement one or more particular abstract data types (ADT). Data structures 138 may include data types and structures, such as locks, lock records, pointers, lockable in-memory objects, etc., that are created and/or used by any components defined by program instructions from HDCT optimization program 136, HDCT command files & HDCT constraint files 134, or other programs (not shown).

Input/output device 140 allows for input and output of data with other devices that may be connected to computer system 110. For example, input/output device 140 can provide a connection to one or more external devices, such as portable computer-readable storage media, computer servers, additional computer systems, etc., which are capable of storing files produced by the platform dump.

Figure 2:
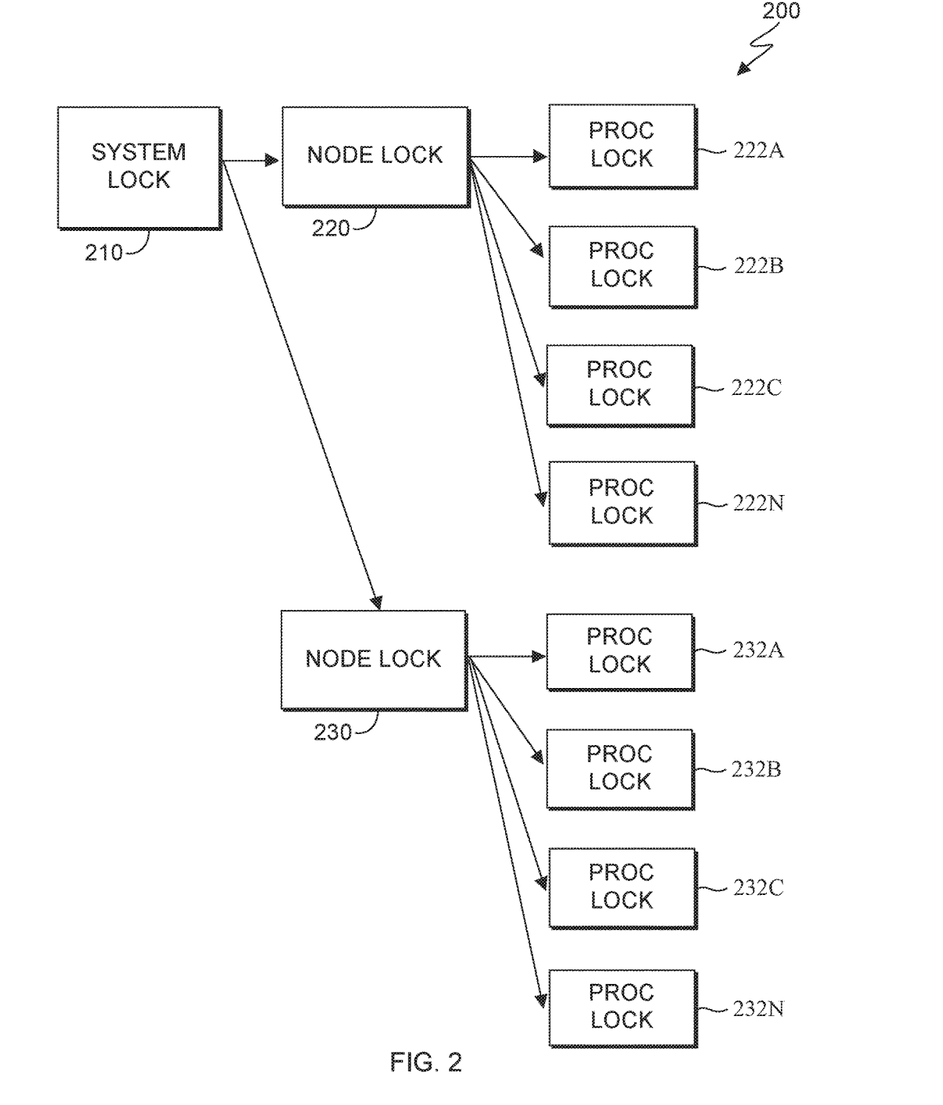
FIG. 2 is an illustration of a hierarchical Hardware Object Model lock, in accordance with an embodiment of the present invention.

FIG. 2 depicts an example of a hierarchical HOM lock, in accordance with an embodiment of the present invention. In this example, computer system 110 is performing a platform dump. In order to perform the platform dump, computer system 110 must iterate through each of the locks in the order determined by the operating system, BIOS, etc. In this example, computer system 110 first determines that system lock 210 must be executed. However, according to the constraints in this example, in order to execute system lock 210, each node of computer system 110 must be locked. Therefore, node lock 220 and node lock 230 must be executed in the order determined by the operating system, BIOS, etc. Upon determining that node lock 220 is to be executed, computer system 110 also determines that multiple processor locks, such as proc lock 222A-N must be executed first, and in the order determined by operating system, BIOS, etc. Likewise with node lock 230, proc lock 232A-N must be executed first before node lock 230 can be executed. Once proc locks 222A-N and 232A-N have been executed, then computer system 110 executes node lock 220 and 230. Once node lock 220 and 230 has been executed, system lock 210 may be executed and the platform dump may occur. In various embodiments, there may be numerous numbers of locks executed at each step, and in various orders, depending on the type of system and the constraints therein.

Figure 3A:
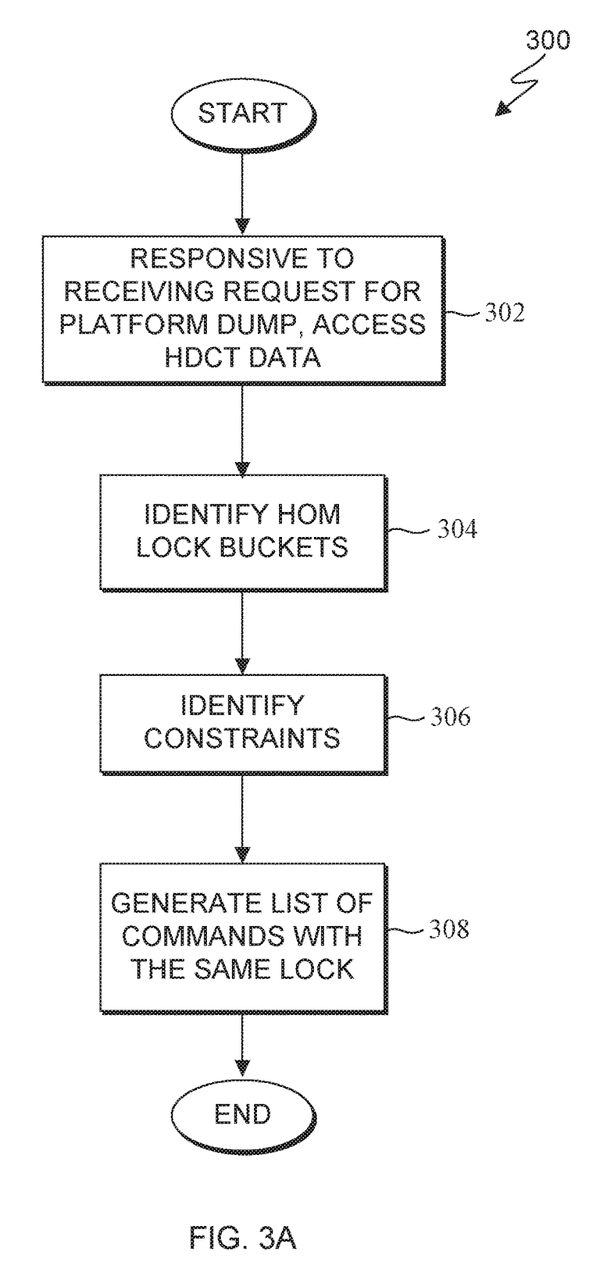
FIG. 3A is a flowchart illustrating operational steps to reduce the number of locks by grouping commands which can be executed with a Hardware Object Model lock, in accordance with an embodiment of the present invention.

FIG. 3A is a flowchart 300 illustrating operational steps to reduce the number of locks by grouping commands which can be executed with an HOM lock, in accordance with an embodiment of the present invention.

In step 302, HDCT optimization program 136, in response to receiving a request for a platform dump, accesses HDCT data. In this exemplary embodiment, HDCT optimization program 136 has received a request for a platform dump, due to, for instance, a program failure. In response to this request, HDCT optimization program 136 accesses HDCT command files & HDCT constraint files 134. HDCT command files & HDCT constraint files 134 includes a list of commands for accessing the system hardware, creating a software lock on the HOM, the constraints for each command, and for what information will be retrieved. Each command collects an amount of information needed by the dump, for instance error codes, processes used, time of failure, etc. The order specified by HDCT command files & HDCT constraint files 134 must be followed for the entire dump. The HDCT command order is crucial to the integrity of the information included in the dump, and each of the commands needs an HOM lock on an appropriate hardware object. The constraints file of HDCT command files & HDCT constraint files 134 is a file that each server will have that is a platform specific file which marks commands that have pre-requirements in a parsable manner.

In step 304, HDCT optimization program 136 identifies HOM lock buckets, based on the accessed HDCT data. In an exemplary embodiment, each of the commands in the HDCT data needs an HOM lock. HDCT optimization program 136 identifies which HOM object the command deals with by analyzing and understanding each of these commands and any locks and/or constraints. For example, a command that states "get-register cache-all 5000" needs cache HOM locks, and a command that states "get-register processor-all 5000" needs processor HOM locks. HDCT optimization program 136 iterates through and parses HDCT command files & HDCT constraint files 134 sequentially to identify buckets, or groups, of commands that need the same HOM lock. In other words, command entries in HDCT command files & HDCT constraint files 134 needing the same HOM lock are added to the same bucket via an appropriate index. An example 1 is provided below.

Example Code 1, wherein the HDCT has the following commands, with the format <command> <destination> <address> <value>:

```
1> get-register processor-all 1000;
2> get-register processor-all 2000;
3> get-register processor-all 1012;
4> put-register processor-all 1008 1000FFFF;
5> get-register memory-all 10000;
6> get-register memory-all 10012;
7> get-register memory-all 80000;
8> get-register processor-all 5000;
9> get-register core-all 5000;
10> get-register cache-all 5000;
11> stop-clocks memory-all;
12> stop-clocks processor-all;
13> get-register memory-all 6000;
14> stop-clocks core-all; 15> get-register core-all 6012;
16> get-register core-all 7012.
```

In this example, HDCT optimization program 136 has identified that some of the commands need the same HOM lock (e.g., commands 5, 6, 7, 11, and 13 need the memory HOM lock). Accordingly, these commands are placed into the same bucket by HDCT optimization program 136. By being placed into the same buckets, commands are grouped together with specific locks that the commands may require in order to execute properly. That does not mean, however, that these commands can be executed in the same order. At the end of this step, there would be an additional step, with the format <HOM lock>:<Command indices, in order, comma separated>, and would be something similar to: Memory-0:5, 6, 7, 11, 13; Memory-1:5, 6, 7, 11, 13; Cache-0:10; Core-0:9, 14, 15, 16; Core-1:9, 14, 15, 16; and so on. In this exemplary embodiment, HDCT optimization program 136 iterates through the commands with an O(n) pass, and collects the information once per server boot.

In step 306, HDCT optimization program 136 identifies the constraints. In the above example (i.e., step 304), HDCT optimization program 136 identifies from the constraints file that there are a couple of known constraints, which may be noted below.

Example Constraints File 1, with the format <Command Index>:<Constraint command indices, in order, comma separated>:

```
15:12;
12:1, 2, 3, 4, 5, 6, 7, 8, 9, 10.
```

In step 308, HDCT optimization program 136 generates a list of commands with the same locks. For example, responsive to determining from the HOM lock buckets, commands with the same locks, HDCT optimization program 136 groups and orders these commands and generates a list based off of these groupings and orderings, as discussed with greater regard in FIG. 3B.

Figure 3B:
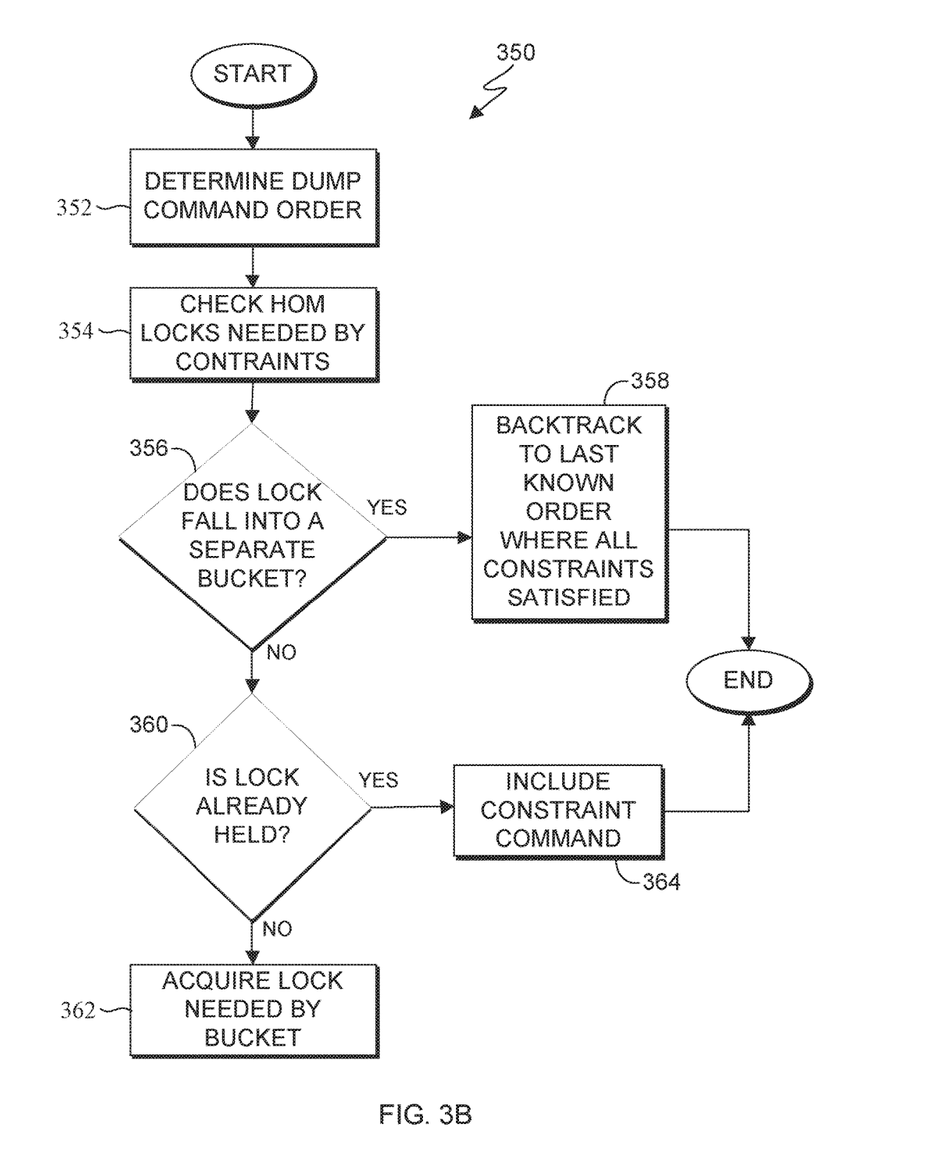
FIG. 3B is a flowchart illustrating operational steps to reduce the number of locks by grouping commands which can be executed with a Hardware Object Model lock, in accordance with an embodiment of the present invention.

FIG. 3B is a flowchart 350 illustrating operational steps to reduce the number of locks by determining commands with the same HOM locks, and grouping said commands, in accordance with an embodiment of the present invention. For example, the operational steps of flowchart 350 can be performed at step 308 of FIG. 3A.

In step 352, HDCT optimization program 136 determines the dump command order. In an exemplary embodiment, a backtracking algorithm is used to determine the dump command order. For each HOM lock bucket identified (i.e., step 304), HDCT optimization program 136 checks each command in that bucket against the constraints file. If a command does have one or more constraints, HDCT optimization program 136 moves on to step 354. In instances where no constraints exist, HDCT optimization program 136 executes a dump command.

In step 354, HDCT optimization program 136 checks the HOM lock or locks needed by the constraint or constraints. In this exemplary embodiment, HDCT optimization program 136 iterates through the constraints file and checks each constraint for what HOM lock (i.e., FIG. 2) is necessary for that constraint. HDCT optimization program 136 then moves on to step 356.

In step 356, HDCT optimization program 136 determines if the lock needed by a constraint falls into a separate bucket. In this exemplary embodiment, each constraint in the list is compared to the previous constraints in the list to determine if the necessary HOM lock for the current constraint falls into a separate grouping, or bucket, as the previous constraint or constraints. In this embodiment, there is more than one type of HOM lock. A constraint may need one, or more than one, type of lock. If the constraint does require a separate bucket, HDCT optimization program 136 moves to step 358. However, if the constraint does not require a separate bucket, it is considered to be in the same bucket as the previous constraint or constraints, and HDCT optimization program 136 moves on to step 360.

If, in step 356, HDCT optimization program 136 determines that the lock needed by a constraint falls into a separate bucket, then, in step 358, HDCT optimization program 136 backtracks to the last known order where all the constraints are satisfied. In this exemplary embodiment, when a lock for a constraint falls into a separate bucket from the previous constraints, HDCT optimization program 136 uses a backtracking algorithm to determine the last known order of the commands where all of the constraints have been satisfied and the generated list may be executed, and the HOM locks for the list executed, without violating any of the constraints. Accordingly, HDCT optimization program 136 generates a list where the HOM locks for the constraints on the list need only be executed once, as opposed to separately for each constraint on the list. In other words, if, for example, HDCT optimization program 136 has determined that there are twenty constraints in the bucket, the HOM locks on the generated list need only be executed once, as opposed to twenty times. This decrease in the number of times an HOM lock is executed decreases the amount of time necessary for the system to be unresponsive to other processes and, therefore, unresponsive to the system's user. In various embodiments, HDCT optimization program 136 may then begin the process again, starting with the constraints that HDCT optimization program 136 determined required a separate bucket. In various other embodiments, HDCT optimization program 136 may then execute the list.

If, in step 356, HDCT optimization program 136 determines that the lock needed by a constraint does not fall into a separate bucket, then, in step 360, HDCT optimization program 136 determines whether or not the lock is already held. In this embodiment, when HDCT optimization program 136 determines that the lock does fall into the same bucket as previous commands, or if this is the first command on the generated list, HDCT optimization program 136 then determines if the HOM lock necessary for the command has already been held by the software and/or hardware of computer system 110. If the lock is held, HDCT optimization program 136 moves to step 364. If the lock is not already held, then HDCT optimization program 136 moves to step 362. For example, if a command requires System Lock 210, Node Lock 220, and Proc Lock 222A (FIG. 2) to be held for a command to be executed, and all three locks are held, HDCT optimization program 136 moves to step 364. However, if only System Lock 210 and Node Lock 220 are held, HDCT optimization program 136 moves to step 362, as not all locks are held for the execution of the command being analyzed.

In step 362, HDCT optimization program 136 acquires the lock needed by the bucket. In this exemplary embodiment, HDCT optimization program 136 determines the lock that will be implemented before the constraint command may be executed. In the example in step 360 where a command requires System Lock 210, Node Lock 220, and Proc Lock 222A (FIG. 2) to be held for a command to be executed, and only System Lock 210 and Node Lock 220 are held, HDCT optimization program 136 may acquire, through the software and/or hardware of computer system 110, a hold on Proc Lock 222A. Once the hold has been accomplished, HDCT optimization program 136 moves to step 364.

In step 364, HDCT optimization program 136 includes the constraint command. In this embodiment, the constraint command is included in the generated list of commands to be executed for the bucket. In various embodiments, HDCT optimization program 136 loops back to analyze the next constraint command, until it has completed the analysis, and then generates an ordered list of dump commands and executes the set of dump commands in the order determined by HDCT optimization program 136. Accordingly, HDCT optimization program 136 generates a list where the HOM locks for the constraints on the list need only be executed once, as opposed to separately for each constraint on the list. In other words, if, for example, HDCT optimization program 136 has determined that there are twenty constraints in the bucket, the HOM locks on the list need only be executed once, as opposed to twenty times. This decrease in the number of times an HOM lock is executed decreases the amount of time necessary for the system to be unresponsive to other processes and, therefore, unresponsive to the system's user. In various embodiments, HDCT optimization program 136 may then execute the list.

Figure 4:
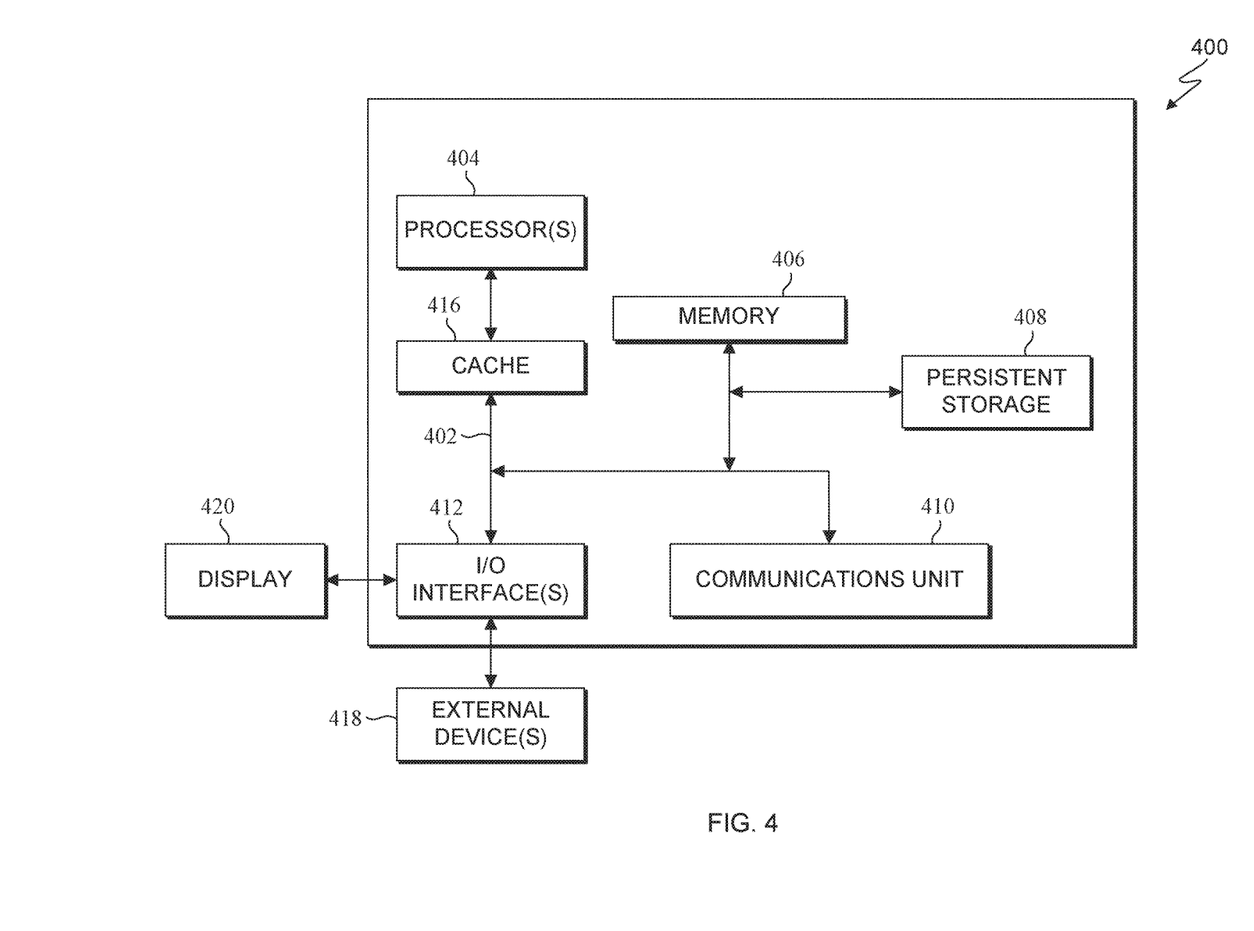
FIG. 4 is a block diagram of internal and external components of the computing device of FIG. 1, in accordance with an embodiment of the present invention.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation and does not imply any limitations with regard to the environments in which different embodiments may be implemented. In general, the components illustrated in FIG. 4 are representative of any electronic device capable of executing machine-readable program instructions. Examples of computer systems, environments, and/or configurations that may be represented by the components illustrated in FIG. 4 include, but are not limited to: personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 400 includes communications fabric 402, which provides for communications between one or more processors 404, memory 406, communications unit 410, and one or more input/output (I/O) interfaces 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In general, memory 406 can include any suitable volatile or non-volatile computer-readable storage media. Software (e.g., HDCT optimization program 136, etc.) is stored in persistent storage 408 for execution and/or access by one or more of the respective processors 404 via one or more memories of memory 406.

Persistent storage 408 may include, for example, a plurality of magnetic hard disk drives. Alternatively, or in addition to magnetic hard disk drives, persistent storage 408 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 408 can also be removable. For example, a removable hard drive can be used for persistent storage 408. Other examples include optical and magnetic disks, thumb drives, and smart cards that are inserted into a drive for transfer onto another computer-readable storage medium that is also part of persistent storage 408.

Communications unit 410 provides for communications with other computer systems or devices. In this exemplary embodiment, communications unit 410 includes network adapters or interfaces such as a TCP/IP adapter cards, wireless local area network (WLAN) interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded through communications unit 410 (e.g., via the Internet, a local area network or other wide area network). From communications unit 410, the software and data can be loaded onto persistent storage 408.

One or more I/O interfaces 412 allow for input and output of data with other devices that may be connected to computer system 400. For example, I/O interface 412 can provide a connection to one or more external devices 418 such as a keyboard, computer mouse, touch screen, virtual keyboard, touch pad, pointing device, or other human interface devices. External devices 418 can also include portable computer-readable storage media such as, for example, thumb drives, portable optical or magnetic disks, and memory cards. I/O interface 412 also connects to display 420.

Display 420 provides a mechanism to display data to a user and can be, for example, a computer monitor. Display 420 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to: an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for improving platform dump collection, the method comprising:
   responsive to receiving a platform dump request for a system that includes one or more hardware and software locks, accessing, by one or more processors, a model of the system hardware and a list including a plurality of commands for a platform dump;
   determining, by one or more processors, whether one or more constraints exist for each of the plurality of commands in the list;
   responsive to determining whether one or more constraints exist for each of the plurality of commands in the list, identifying, by one or more processors, which of the one or more hardware and software locks are required by the one or more constraints;
   responsive to identifying which of the one or more hardware and software locks are required by the one or more constraints, determining, by one or more processors, whether a first hardware and software lock of the one or more hardware and software locks is required by both a first constraint and a second constraint of the one or more constraints;
   responsive to determining that the first hardware and software lock of the one or more hardware and software locks is required by the first constraint and the second constraint, generating, by one or more processors, a grouping of the first constraint and the second constraint; and
   generating, by one or more processors, an executable list of commands, based on the grouping of the first constraint and the second constraint and a determination as to whether the first hardware and software locks are held.

2. The method of claim 1, further comprising:
   responsive to determining that one or more constraints do not exist for each of the plurality of commands in the list, executing, by one or more processors, the list including the plurality of commands for the platform dump.

3. The method of claim 1, wherein the executable list of commands is based on the grouping of the first constraint and the second constraint and a determination as to whether the first hardware and software locks are held, further comprises:
   determining, by one or more processors, that the first hardware and software lock of the one or more hardware and software locks is not required by a third constraint of the one or more constraints; and
   responsive to determining that the first hardware and software lock is not required by the third constraint, determining, by one or more processors, whether the first hardware and software lock is held.

4. The method of claim 3, further comprising:
   responsive to determining that the first hardware and software lock is held, adding, by one or more processors, a command from the plurality of commands that require the first hardware and software lock to the executable list of commands.

5. The method of claim 3, further comprising:
   responsive to determining the first hardware and software lock is not held, holding, by one or more processors, the first hardware and software lock; and
   responsive to holding the first hardware and software lock, including, by one or more processors, in the executable list, a command from the plurality of commands in the list that requires the one or more constraints that requires the first hardware and software lock.

6. The method of claim 1, further comprising:
   executing, by one or more processors, the executable list of commands.

7. The method of claim 3, further comprising:
responsive to determining that the first hardware and software lock of the one or more hardware and software locks is not required by the third constraint, executing, by one or more processors, a command from the plurality of commands in the list that requires the third constraint.

8. A computer program product for improving platform dump collection, the computer program product comprising:
one or more computer readable storage medium and program instructions stored on the computer readable storage medium, the program instructions comprising:
responsive to receiving a platform dump request for a system that includes one or more hardware and software locks, program instructions to access a model of the system hardware and a list including a plurality of commands for a platform dump;
program instructions to determine whether one or more constraints exist for each of the plurality of commands in the list;
responsive to determining whether one or more constraints exist for each of the plurality of commands in the list, program instructions to identify which of the one or more hardware and software locks are required by the one or more constraints;
responsive to identifying which of the one or more hardware and software locks are required by the one or more constraints, program instructions to determine by one or more processors, whether a first hardware and software lock of the one or more hardware and software locks is required by both a first constraint and a second constraint of the one or more constraints;
responsive to determining that the first hardware and software lock of the one or more hardware and software locks is required by the first constraint and the second constraint, program instructions to generate a grouping of the first constraint and the second constraint; and
program instructions to generate an executable list of commands, based on the grouping of the first constraint and the second constraint and a determination as to whether the first hardware and software locks are held.

9. The computer program product of claim 8, further comprising:
responsive to determining that one or more constraints do not exist for each of the plurality of commands in the list, program instructions to execute the list including the plurality of commands for the platform dump.

10. The computer program product of claim 8, wherein the executable list of commands is based on the grouping of the first constraint and the second constraint and a determination as to whether the first hardware and software locks are held, further comprises:
program instructions to determine that the first hardware and software lock of the one or more hardware and software locks is not required by a third constraint of the one or more constraints; and
responsive to determining that the first hardware and software lock is not required by the third constraint, program instructions to determine whether the first hardware and software lock is held.

11. The computer program product of claim 10, further comprising:
responsive to determining that the first hardware and software lock is held, program instructions to add a command from the plurality of commands that require the first hardware and software lock to the executable list of commands.

12. The computer program product of claim 10, further comprising:
responsive to determining the first hardware and software lock is not held, program instructions to hold the first hardware and software lock; and
responsive to holding the first hardware and software lock, program instructions to include in the executable list, a command from the plurality of commands in the list that requires the one or more constraints that requires the first hardware and software lock.

13. The computer program product of claim 8, further comprising:
program instructions to execute the executable list of commands.

14. The computer program product of claim 10, further comprising:
responsive to determining that the first hardware and software lock of the one or more hardware and software locks is not required by the third constraint, program instructions to execute a command from the plurality of commands in the list that requires the third constraint.

15. A computer system for improving platform dump collection, the computer system comprising:
one or more computer processors;
one or more computer readable storage media;
program instructions stored on the one or more computer readable storage media for execution by at least one or the one or more processors, the program instructions comprising:
responsive to receiving a platform dump request for a system that includes one or more hardware and software locks, program instructions to access a model of the system hardware and a list including a plurality of commands for a platform dump;
program instructions to determine whether one or more constraints exist for each of the plurality of commands in the list;
responsive to determining whether one or more constraints exist for each of the plurality of commands in the list, program instructions to identify which of the one or more hardware and software locks are required by the one or more constraints;
responsive to identifying which of the one or more hardware and software locks are required by the one or more constraints, program instructions to determine by one or more processors, whether a first hardware and software lock of the one or more hardware and software locks is required by both a first constraint and a second constraint of the one or more constraints;
responsive to determining that the first hardware and software lock of the one or more hardware and software locks is required by the first constraint and the second constraint, program instructions to generate a grouping of the first constraint and the second constraint; and
program instructions to generate an executable list of commands, based on the grouping of the first constraint and the second constraint and a determination as to whether the first hardware and software locks are held.

16. The computer system of claim 15, further comprising:
responsive to determining that one or more constraints do not exist for each of the plurality of commands in the list, program instructions to execute the list including the plurality of commands for the platform dump.

17. The computer system of claim 15, wherein the executable list of commands is based on the grouping of the first constraint and the second constraint and a determination as to whether the first hardware and software locks are held, further comprises:

program instructions to determine that the first hardware and software lock of the one or more hardware and software locks is not required by a third constraint of the one or more constraints; and     responsive to determining that the first hardware and software lock is not required by the third constraint, program instructions to determine whether the first hardware and software lock is held.

18. The computer system of claim 17, further comprising:

responsive to determining that the first hardware and software lock is held, program instructions to add a command from the plurality of commands that require the first hardware and software lock to the executable list of commands.

19. The computer system of claim 17, further comprising:

responsive to determining the first hardware and software lock is not held, program instructions to hold the first hardware and software lock; and     responsive to holding the first hardware and software lock, program instructions to include in the executable list, a command from the plurality of commands in the list that requires the one or more constraints that requires the first hardware and software lock.

20. The computer system of claim 15, further comprising:

program instructions to execute the executable list of commands.

\* \* \* \* \*